United States Patent
Berthoud et al.

(10) Patent No.: US 6,345,187 B1
(45) Date of Patent: Feb. 5, 2002

(54) RECEIPT OF TYPE II CALLER IDENTIFICATION IN MULTI-CORDLESS ENVIRONMENT

(75) Inventors: Charles William Berthoud, Nazareth; Syed S. Ali, Allentown, both of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/317,431

(22) Filed: May 24, 1999

(51) Int. Cl.[7] ............................................. H04Q 7/20
(52) U.S. Cl. .................... 455/462; 455/88; 455/415; 455/420
(58) Field of Search ..................... 455/88, 415, 416, 455/462, 463, 465, 574, 575, 92, 564, 565, 517, 518, 194.1, 200.1, 174.1, 420, 550

(56) References Cited

U.S. PATENT DOCUMENTS

| | | | | |
|---|---|---|---|---|
| 4,467,140 A | * | 8/1984 | Fathauer et al. ............ | 455/462 |
| 4,878,238 A | * | 10/1989 | Rash et al. ................. | 455/411 |
| 5,384,828 A | * | 1/1995 | Brown et al. ............... | 455/462 |
| 5,530,737 A | * | 6/1996 | Bartholomew et al. ...... | 455/410 |
| 5,575,002 A | * | 11/1996 | Mulford ................... | 455/194.1 |
| 5,581,599 A | | 12/1996 | Tsuji et al. .................. | 379/63 |
| 5,646,979 A | | 7/1997 | Knuth ........................ | 455/563 |
| 5,671,267 A | * | 9/1997 | August et al. .............. | 455/465 |
| 5,703,934 A | | 12/1997 | Zicker et al. ................ | 379/61 |
| 5,748,707 A | * | 5/1998 | Sanserino ................... | 455/570 |
| 5,752,195 A | * | 5/1998 | Tsuji et al. ................. | 455/462 |
| 5,758,292 A | * | 5/1998 | Iida ............................. | 455/550 |
| 5,850,601 A | | 12/1998 | Aida et al. .................. | 455/426 |
| 5,930,729 A | * | 7/1999 | Khamis et al. .............. | 455/571 |
| 6,055,416 A | * | 4/2000 | Hachimura .................. | 455/70 |
| 6,173,169 B1 | * | 1/2001 | Oh ............................... | 455/404 |
| 6,223,154 B1 | * | 4/2001 | Nicholls et al. ............ | 704/233 |

* cited by examiner

Primary Examiner—Dwayne Bost
Assistant Examiner—Jean A Gelin
(74) Attorney, Agent, or Firm—Dickstein Shapiro Morin & Oshinsky LLP

(57) ABSTRACT

The present invention discloses a method and apparatus for receiving Type II CID data in an environment containing multiple off-hook cordless telephones, all being fitted for receiving CID data, and all residing on the same subscriber line. This is achieved by coordinating the sending, receiving, and acknowledging (i.e., handshaking) of muting control signals within a cordless link between a designated master telephone unit and designated slave telephone extensions.

66 Claims, 5 Drawing Sheets

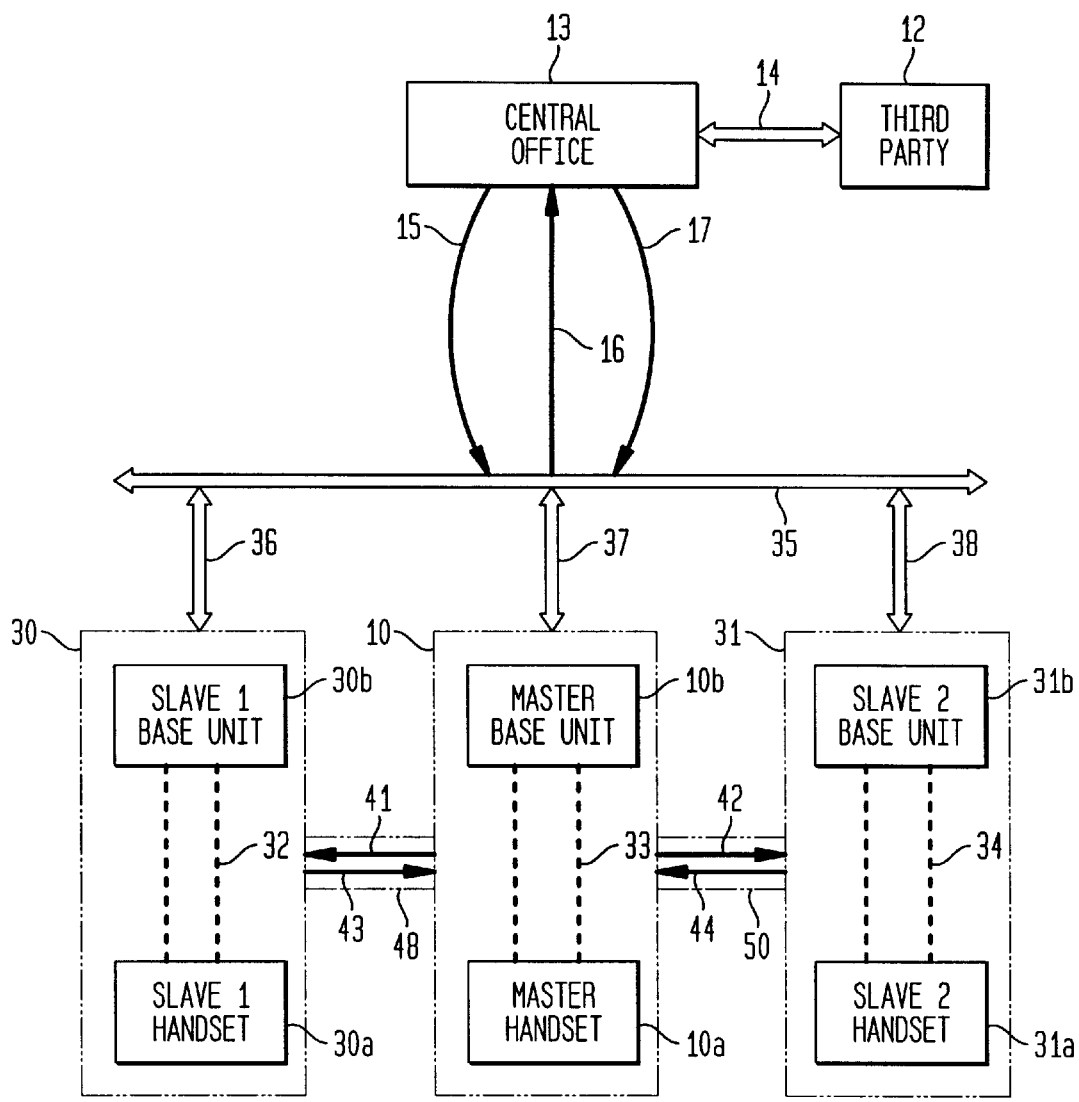

RECEIPT OF TYPE II CALLER IDENTIFICATION IN MULTI-CORDLESS ENVIRONMENT

BACKGROUND OF THE INVENTION

1. Field of the Invention

The present invention relates to caller identification (CID) technology within a cordless telephone environment. More specifically, it relates to the receipt and display of Type II CID data by multiple cordless telephones within a single household.

2. Description of the Related Art

Cordless telephones have proven to be popular in domestic, business and industrial environments due to the unrestricted freedom of movement they provide users. In fact, in 1997, for the first time ever, sales of cordless telephones exceeded sales of corded telephones with total cordless units sold being in excess of 28 million. Furthermore, total sales for 1998 are expected to have increased over 1997 sales by at least 25 percent.

With a cordless telephone, a telephone subscriber is not confined by the limitation of a station set extension cord. Instead, the subscriber has complete freedom of movement within a radio frequency (RF) link range of up to about 300 m between a stationary base and its cordless portable handset.

Along with the continued growth of cordless telephone sales are the increased umber of conveniences being offered for use on cordless telephones. Among the any such services are caller identification (CID) and call waiting.

CID is a well known feature that allows a telephone user to identify the party making an incoming call before the call is answered. When a telephone call is directed to a customer having the CID service, the central telephone office (CO) transmits a CID message concurrently with the incoming call. Specifically, the CID data is typically transmitted to the recipient between rings of the incoming call. Upon receipt of the CID data, the dialed party may use the CID data to screen his or her incoming calls, keep a journal of incoming calls, monitor for prank calls, or for any other personal or business need.

To enjoy the benefits of conventional CID service, a person typically rents or purchases a special component that receives and displays the CID data. This component may, for example, be a separate box that must be connected in line with a standard telephone unit. Cordless telephone subscribers may take advantage of the CID service by utilizing the special CID box in combination with the cordless base station. Still others, may be in possession of a cordless telephone unit capable of displaying the CID data at the handset itself through an integral CID display. Such units allow both the telephone handset and the CID feature to be mobile, thereby adding to the overall convenience of the telephone.

Call waiting is an equally well known feature, whereby a subscriber is virtually assured that he or she will not miss an incoming telephone call. That is, if the subscriber is currently using the telephone, and another call comes through on the same line, a slight tone will be heard by the subscriber. If the subscriber wishes, the current telephone call may be placed on hold while the subscriber checks to see who is on the other line. This is achieved by momentarily pressing a key on the receiver or by depressing an on-hook button. The subscriber may switch back and forth between calls as often as he or she wishes. Similarly to the CID feature, the call waiting feature has been available on cordless telephones for some time now.

Recently, the above described features of CID and call waiting have been combined to create caller identification on call waiting (CIDCW). CIDCW is often referred to in the art as Type II CID. With Type II CID, instead of simply receiving a slight tone, the subscriber can actually discern who is on the other line when they're already engaged in a telephone conversation by virtue of the received Type II CID information. The subscriber can then make an informed decision about whether to interrupt the on-line caller.

FIG. 1 depicts a block diagram of the "handshaking" required in order to implement the Type II CID feature. First, an initial telephone call between the subscriber 10 and a second party 11 is already in progress. As is known in the art, the call between subscriber 10 and the second party 11 is routed through a central office (CO) 13 via communication links 20 and 21. The subscriber 10 actually receives the call on subscriber line 35 through telephone line 37. Next, a third party 12 seeks to place a telephone call directly to the subscriber 10, however, the third party's 12 call must first be routed through the CO 13, via communication link 14. Next, the CO 13 sends two signals 15 (a subscriber alerting signal (SAS) and a CPE alerting signal (CAS)) to the subscriber 10, alerting the subscriber of the incoming telephone call from the third party 12. The subscriber's 10 telephone unit then sends an acknowledgement signal 16 back to the CO 13, alerting the CO that it is ready to accept the Type II CID data 17. The CO then sends the data 17 to the subscriber 10, where it is displayed and whereby the subscriber may make an informed decision as to whether the call between him or herself 10 and the second party 11 should be interrupted in favor of the call from third party 12.

Turning now to FIG. 2, a flowchart depicts, in more detail, the above described handshaking between the CO 13 and the subscriber's 10 telephone unit. Similar to FIG. 1, the process begins with a telephone call being placed from a third party 12 to the subscriber's telephone at step S1; the subscriber's telephone unit being well known in the art as customer premise equipment (CPE). Next, the CO 13 directly receives the call from the third party at step S2. Next, the CO 13 determines whether the called CPE 10 is currently in use at step S3. If the CO 13 determines that the CPE 10 is not in use, the call is forwarded directly to the CPE 10 at step S4. However, if the CO 13 determines that the called CPE 10 is currently in use, a subscriber alerting signal (SAS), and a CPE alerting signal (CAS) are sent to the CPE 10 at step S5. The SAS is a low frequency tone (e.g., 440 Hz), audible to the subscriber only. The SAS lasts for approximately 300 ms and serves to alert the subscriber of the incoming telephone call. The CAS is a dual-tone signal combination, both being of fairly high frequency (e.g., 2130 Hz and 2750 Hz, respectively) and lasting for approximately 80 ms, or long enough to alert the CPE of the incoming telephone call. Additionally, the CO 13 temporarily removes the second party 11 from the current call during the transmission of the SAS and CAS. Next, the CPE 10 actually receives the signal pair (i.e., the SAS and CAS) 15 at step S6.

The CPE 10 must now decide whether it is prepared to receive the CID data. In so deciding, the CPE 10 determines whether any additional extensions on the same telephone line are currently in use (i.e., in addition to the CPE) at step S7. Most CPE manufacturers detect whether other extension (s) are off-hook by monitoring the line voltage. If the line voltage drops below a certain value, the CPE assumes there is another extension off-hook. If there is another device (or devices) in use, they all receive the SAS/CAS signal pair 15 concurrently with the CPE. The CPE 10, however, cannot at that time accept the CID data because all off-hook units, including all extensions, must be muted in order to receive the CID data and as the state of the art currently exists, the CPE 10 is incapable of muting other off-hook units. Therefore, the CPE 10 will continuously check to see if the other extensions have been deactivated (i.e., placed back on-hook), so as to enable the receipt of CID data by all CID-capable telephones coupled to a common telephone line.

If the CPE 10 is the only telephone currently off-hook, the CPE 10 will then mute the CPE handset at step S8 in preparation for sending acknowledgment signals back to the CO 13, thereby alerting the CO 13 that it is prepared to receive the CID data 17. The acknowledgement signals are sent to the CO 13 at step S9 in dual tone multi frequency (DTMF) format (i.e., "touch tone"). Upon receipt of the DTMF acknowledgement signal 16 at step S10, the CO 13, in turn, forwards the CID data 17 to the CPE 10 at step S11, whereby the subscriber may then make an informed decision as to whether the call that is already in progress should be interrupted in favor of the incoming call from the third party.

From the description above, it should be readily apparent that an important inquiry focuses on whether another extension is concurrently being used within the same household, and on the same telephone line, as the CPE 10. This is relevant because, as described at steps S7 and S8 of the FIG. 2 flowchart, not only must the handset of the CPE be muted before it's able to receive the CID data 17 from the CO 13, but all other off-hook extensions must be on-hook since the CPE 10 is currently incapable of muting any such off-hook extensions.

The reason for muting the CPE handset is two-fold: i) muting the CPE handset prevents the subscriber from hearing the DTMF acknowledgement signal, the signal being of considerable magnitude and is likely to be somewhat disturbing to the listener; and ii) muting the CPE handset prevents interference from speech and other noise from being transmitted along with the DTMF acknowledgement signal.

Furthermore, if more than one unit is off-hook, each of the off-hook units will seek to be the unit that issues the DTMF acknowledgment signal; a scenario likely to result in confusion and system malfunctions.

Since the CPE is currently incapable of muting any off-hook extensions it has detected, no cordless telephones that are coupled to a common telephone line can receive CID data although they are intended to incorporate the CID feature. Thus, there exists a need for an apparatus and system which allows for multiple off-hook cordless telephones that are connected to a common telephone line to receive Type II CID data.

SUMMARY OF THE INVENTION

The present invention overcomes the problems associated with the prior art and provides a method and system for receiving Type II CID data in an environment containing multiple off-hook cordless telephones, all being fitted for receiving CID data, and all being coupled to a common subscriber line. This is achieved by coordinating the sending, receiving, and acknowledging (i.e., handshaking) of control signals between the multiple cordless telephones and the CO. In a preferred embodiment of the invention, the communication between cordless telephones takes place through a wireless connection between each off-hook slave extension and a master unit.

In accordance with the present invention, the handshaking results in the sending of a muting command signal to each off-hook extension and also the sending of a DTMF acknowledgement signal by the CPE to the CO acknowledging the preparedness of the multiple cordless telephones for receiving CID data. Thereafter, the CID data is actually sent to the subscriber line.

The above described process allows a telephone subscriber to have multiple cordless telephones coupled to a common telephone line and, wherein each of the cordless telephones receives CID data. That is, e.g., a CID fitted cordless telephone may be placed in all rooms of the home without requiring additional wiring or a special connection to the existing telephone line. Furthermore, the invention may be incorporated into any telephone that uses a wireless link to pass speech information between its handset and its base station.

BRIEF DESCRIPTION OF THE DRAWINGS

These and other advantages and features of the invention will be more clearly understood from the following detailed description of the invention which is provided in connection with the accompanying drawings in which:

FIG. 4 illustrates a block diagram of handshaking required to implement an embodiment of the present invention in a multiple party cordless telephone environment;

DETAILED DESCRIPTION OF PREFERRED EMBODIMENT

A preferred embodiment of the present invention will now be described with reference to FIGS. 3–6. Other embodiments may be realized and structural, or logical changes may be made to and equivalents used for elements of the disclosed embodiment without departing from the spirit or scope of the present invention.

Figure 1:
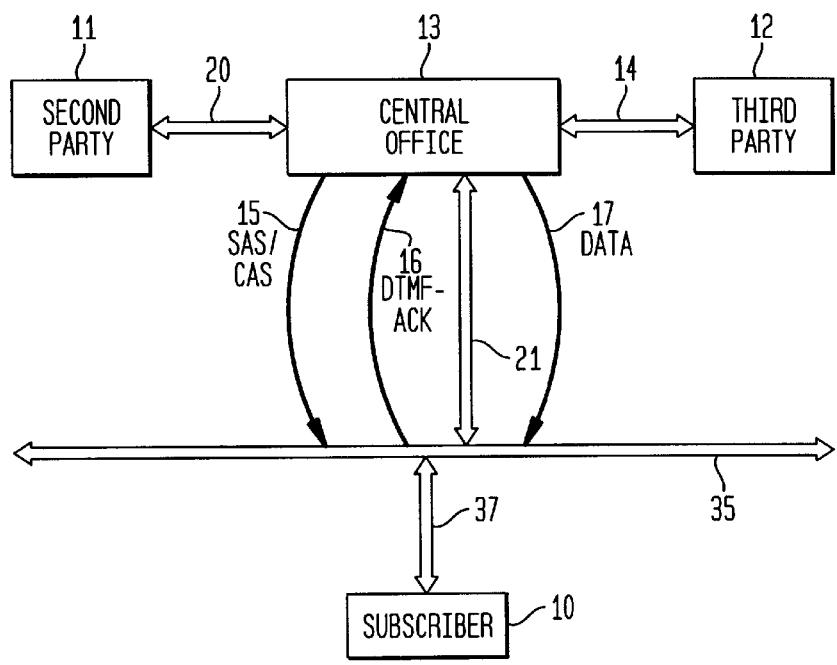
FIG. 1 illustrates a block diagram of the handshaking currently required to successfully transmit Type II CID data to a CPE.
Figure 3:
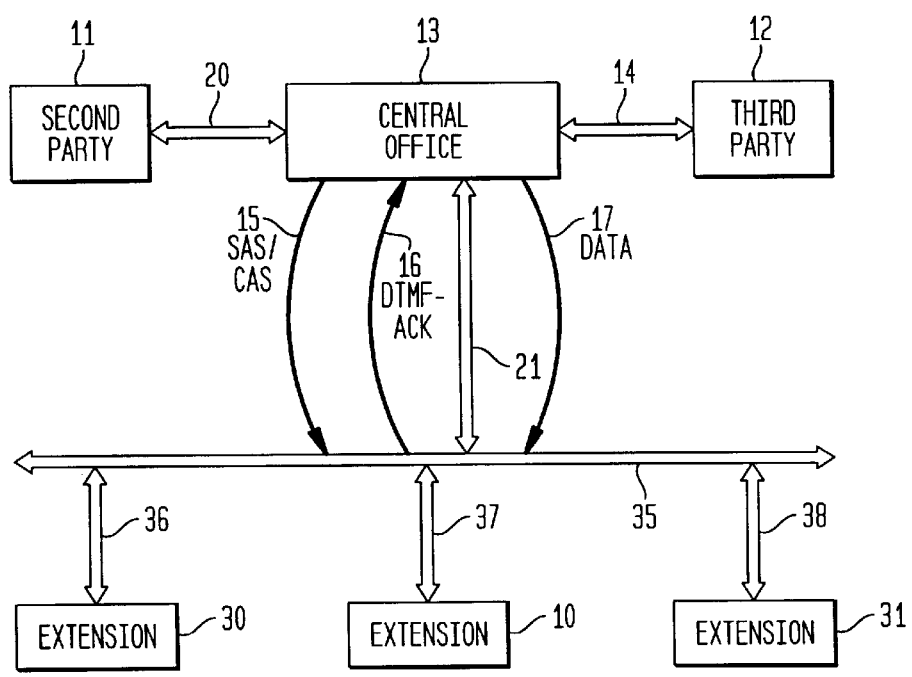
FIG. 3 illustrates a block diagram of a typical multiple party cordless telephone environment.
Figure 2:
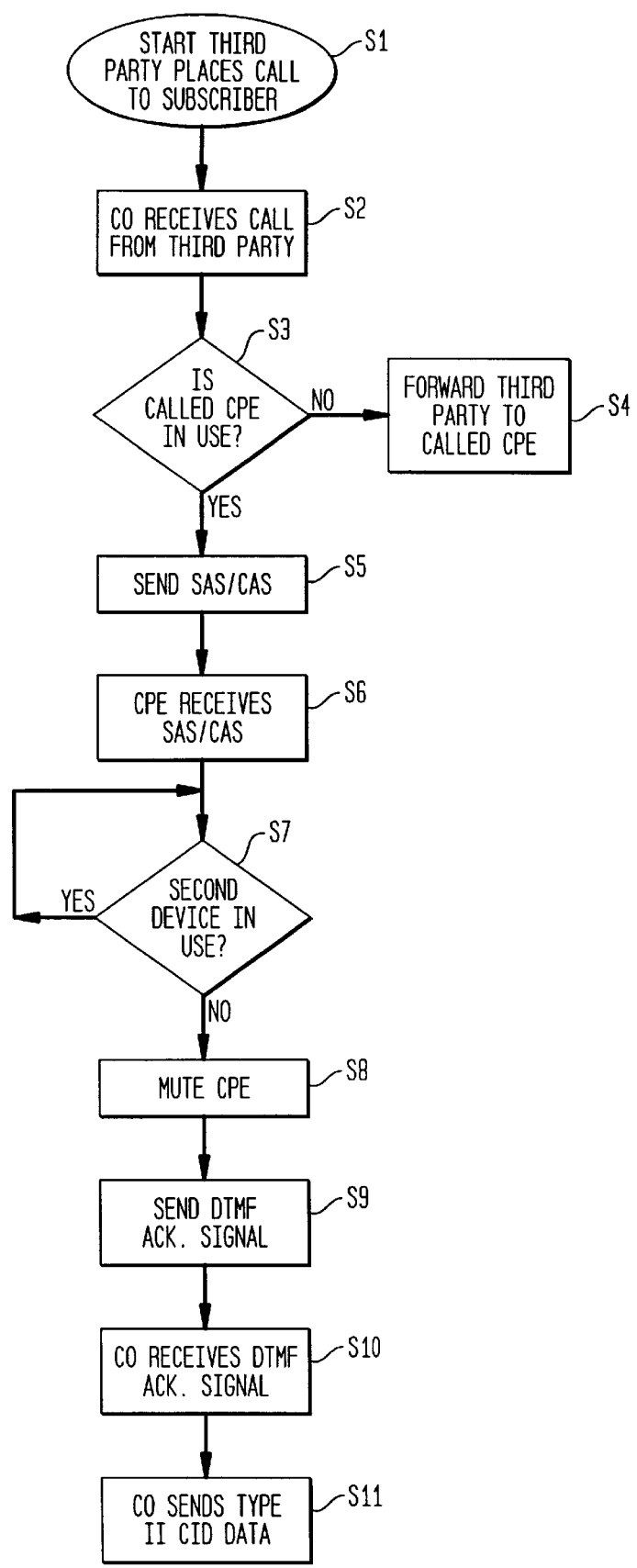
FIG. 2 illustrates a flowchart describing the FIG. 1 block diagram in more detail.

FIG. 3 depicts a typical multiple party cordless telephone environment. The FIG. 3 environment differs from the FIG. 1 environment only in that the FIG. 3 environment has a subscriber phone 10 plus two additional extensions 30, 31, all of which are coupled to the same subscriber telephone line 35.

For purposes of the ensuing discussion we will assume that each of the cordless telephones 10, 30, 31 are off-hook and currently engaged in an open line communication with the second party 11. Communication with the second party 11 is achieved via common telephone line 35, to which the subscriber 10, the first extension 30 and the second extension 31 are coupled via telephone lines 37, 36, and 38, respectively. Common telephone line 35 is, in turn, coupled to the second party 11 via communication link 21, the CO 13, and communication link 20.

In accordance with the present invention, one telephone unit is designated the master unit 10, wherein all other extensions 30, 31 are designated slave extensions. That is, while all slave extensions 30, 31 are capable of direct communication with the CO 13, and do, in fact, receive the SAS/CAS signal pair 15, only the master unit 10 is charged with the responsibility of both detecting and acknowledging receipt of the CAS/SAS signal pair 15. The master/slave designations can be redefined each time multiple telephones are connected to a common telephone line. For instance, the master designation can belong to the first telephone that goes off-hook on the common telephone line 35. In an alternative embodiment, a dedicated master unit and dedicated slave extensions may be pre-designated.

Turning now to FIG. 4, in accordance with a preferred embodiment of the invention, a block diagram details handshaking required for implementing Type II CID in the FIG. 3 multiple cordless environment. The block diagram depicts each of the cordless units 10, 30, 31 as being divided into two separate respective portions, a handset 10a, 30a, 31a and a base unit 10b, 30b, 31b. Each handset/base unit pair 10a/10b, 30a/30b, 31a/31b is depicted as being coupled together by a respective wireless link, such as a RF link 33, 32, 34. It is via these respective wireless links 33, 32, 34 that speech is passed between respective handset/base unit pairs 10a/10b, 30a/30b, 31a/31b.

In accordance with a preferred embodiment of the invention, all units 10, 30, 31 receive the SAS/CAS signal pair 15 from the CO 13, however, it is the master cordless unit 10 that has primary responsibility for detecting the signal pair 15, coordinating the muting of its own speaker and microphone, and also coordinating the muting of the speakers and microphones of the extensions 30, 31. Additionally, it is the master unit 10 that must respond to the signal pair 15 with a DTMF acknowledgement signal 16 to the CO 13. As previously mentioned with respect to FIG. 3, all telephones are capable of being designated a master or a slave extension unit, however, they may be configured such that the first active telephone on a common telephone line (i.e., the first telephone to go off-hook) becomes the master unit. For example, when each telephone goes off-hook, it determines by e.g., detecting line voltage, if there are other off-hook phones on the line. If not, the telephone assumes master status; if at least one other off-hook telephone is detected, it assumes slave status. Alternatively, as previously described, a master/slave assignment may be pre-designated.

The SAS/CAS signal pair 15 is received by each cordless base unit 10b, 30b, 31b from the CO 13 via common telephone line 35. As the master unit 10 has primary responsibility for the system, the master unit 10 performs certain specific functions upon its receipt of the SAS/CAS signals 15.

The functions performed by the master unit 10 include: i) detecting whether a slave extension (e.g., 30, 31) is currently in an off-hook condition; and ii) if all slave extensions are on-hook, then master unit 10 must mute itself This latter step of muting itself requires the muting of any microphones and speakers in either the handset 10a or base unit 10b within master unit 10. In addition, the master unit 10 must send a DTMF acknowledgement signal to the CO 13 to acknowledge its preparedness to receive CID data 17.

If, in the above described detection of off-hook slave extensions, the master unit 10 does detect at least one slave extension as being in an off-hook condition, master unit 10 sends a respective muting command signal 41, 42 via a wireless link 48, 50 between the master unit 10 and each off-hook slave extension 30, 31. Upon receiving the respective muting command signals, each off-hook slave extension mutes any respective microphones and speakers which it may include in preparation for receiving the incoming CID data. The muting of the microphones and speakers is effectuated through well known means.

Additionally, each slave extension 30, 31 sends a respective muting acknowledgement signal 43, 44 back to the master unit 10 for confirming the successful muting of that slave extension, via the same respective wireless links 48, 50 used to send the muting command signals 41, 42.

Similarly to when the master unit 10 is the only off-hook unit, the master unit 10 has the responsibility of sending a DTMF acknowledgement signal 16 to the CO 13 when at least one slave extension is also in an off-hook condition, thereby acknowledging that all off-hook cordless telephones 10, 30, 31 will be prepared to accept the CID data 17 at the time it is sent from the CO 13.

After its receipt of the DTMF acknowledgement signal 16, the CO 13 transmits the CID data 17 to the common telephone line 35, where all cordless telephones 10, 30, 31 can receive the data through their respective telephone lines 37, 36, 38.

It should be readily apparent that although only three cordless telephones have been depicted in the multi-cordless environment for purposes of simplicity, any number of cordless telephones may be used in successfully practicing the invention. Furthermore, the invention may be successfully implemented within any cordless telephone environment employing a wireless, e.g., RF, link between a handset and a base unit.

While a preferred embodiment of the invention's implementation within a multi-cordless environment has been described, it should be readily apparent that any configuration and/or combination of hardware may be used to perform the same, or similar operations as those performed by the FIG. 4 block diagram. For example, the master unit 10 may be configured to send its muting command signal to any off-hook slave extensions 30, 31 through the common telephone line 35, rather than through respective wireless links 48, 50, where each slave extension's respective base unit 30b, 31b may then perform the required muting of the extensions' speakers and microphones which may exist within the base unit 30b, 31b or the handset 30a, 31a.

Additionally, while the invention describes the muting command signals and muting acknowledgement signals as being delivered via a wireless link 48, 50 (e.g., RF link) that exists between cordless telephones 10, 30, 31, the wireless link may exist between any combination of portions of the telephones 10, 30, 31. For example, the wireless link may exist between the master handset 10a and each slave handset 30a, 31a, or the wireless link may exist between the master handset 10a and each slave base unit 30b, 31b. Another configuration can have the wireless link existing between the master base unit 10b and both slave extension base units 30b, 31b or between the master base unit 10b and both slave extension handsets 30a, 31a.

Figure 5:
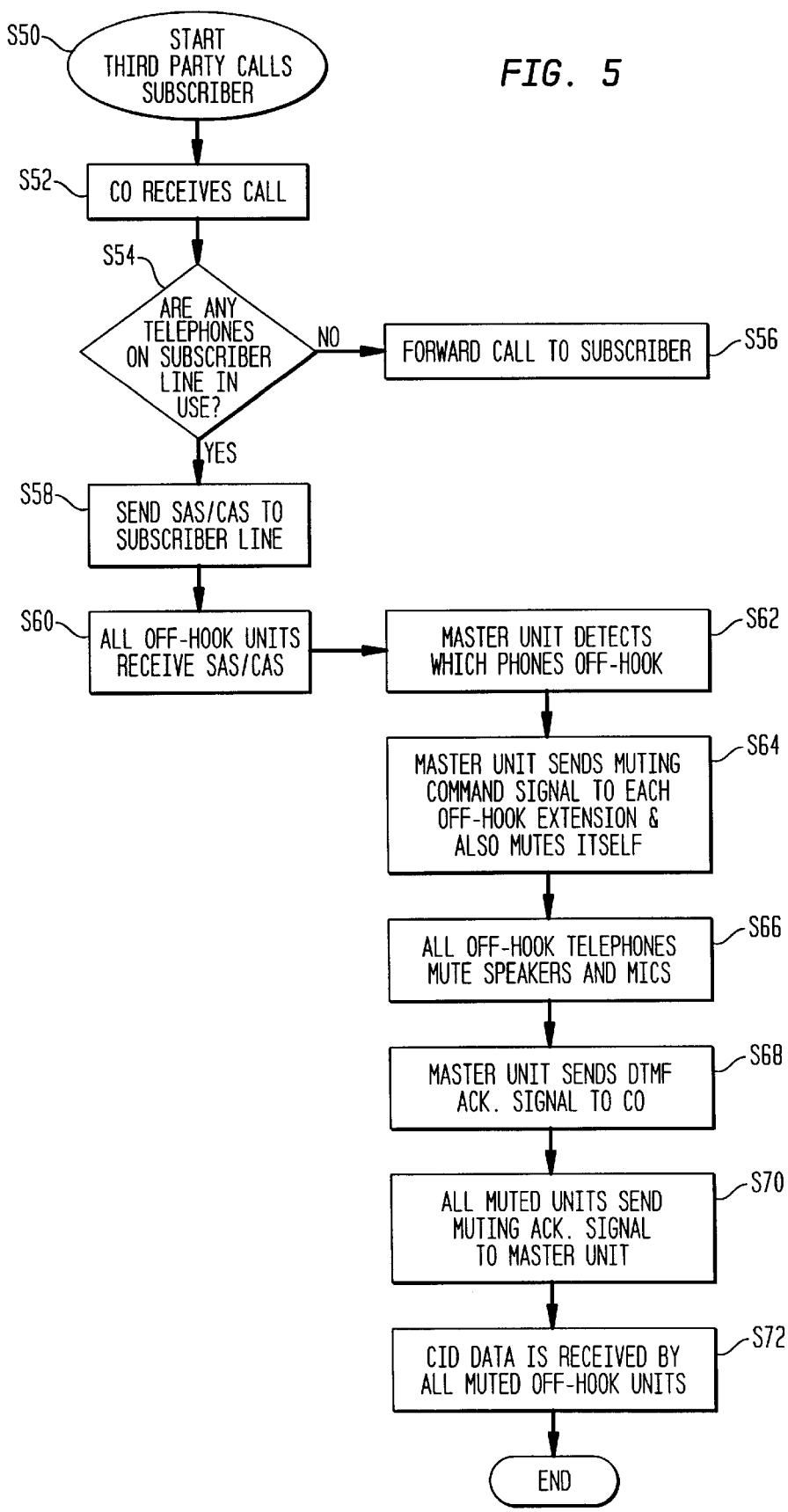
FIG. 5 illustrates a flowchart describing the FIG. 4 block diagram in more detail.

Turning now to FIG. 5, a flowchart depicts, in more detail, a process which may be carried out by the FIG. 4 structures. The exact order in which the following processes are carried out may, of course, be modified without deviating from the scope of the present invention. Starting with step S50, a third party calls a subscriber. Next, the CO 13 receives the call at step S52. The CO 13 determines if a telephone (such as the master unit (MU) 10 (of FIG. 4) or a slave extension (SE) 30, 31 (of FIG. 4)) is currently off-hook at step S54. If neither the MU 10 nor a SE 30, 31 are off-hook, the CO 13 forwards the call to the subscriber at step S56. If at least one telephone is off-hook, the CO 13 sends the SAS/CAS signal pair 15 to the subscriber line 35 at step S58 where all off-hook telephones receive the signal pair 15 at step S60.

The MU 10 then determines which telephones are off-hook at step S62. The determination of which slave extension telephones 30, 31 are off-hook is carried out by the master unit 10 through the respective wireless links 48, 50 between the master unit 10 and each slave extension 30, 31. That is, if a wireless link is detected between the master unit 10 and a respective slave extension 30, 31, then that slave extension must be off-hook. Alternatively, the master unit 10 may be configured to read a voltage level of the common subscriber telephone line 35 to determine whether a slave extension 30, 31 is off-hook, as previously described.

At step S64, the MU sends a respective muting command signal 41, 42 to each off-hook slave extension via a respective wireless link 48, 50 (e.g., a RF link). At step S66, all off-hook telephones are muted in preparation for receiving CID data 17. At step S68, the MU 10 sends a DTMF acknowledgement signal 16 to the CO 13. A respective muting acknowledgement signal 43, 44 is sent back to the MU 10 from each off-hook extension at step S70. At step S72, the CID data 17 is sent to all muted off-hook slave extensions 30, 31 and the MU 10.

Figure 6:
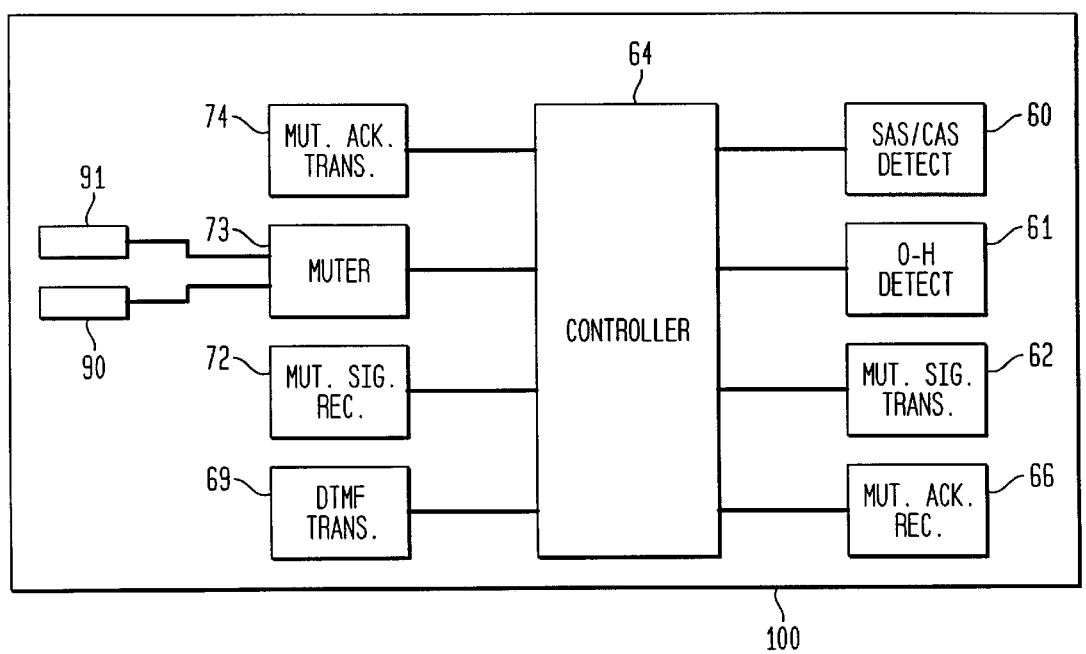
FIG. 6 illustrates a block diagram of circuitry located within a preferred embodiment of a cordless telephone device of the invention.

Turning now to FIG. 6, a block diagram of a preferred embodiment of a cordless telephone device of the invention 100 is depicted. As previously described, each telephone on the subscriber line 35 may serve as a master unit or a slave extension and accordingly, the following description applies to a cordless telephone which may serve as either a master unit 10 or a slave extension 30, 31.

A controller 64 is located within the telephone 100 and coordinates the sending of muting command signals, the receiving of muting acknowledgement signals and the sending of DTMF acknowledgement signals, as described in FIG. 5. It should be readily apparent that the functions performed by controller 64, as described below, may be carried out with a processor, e.g., a digital signal processor (DSP), a central processing unit (CPU), an application specific integrated circuit (ASIC), digital logic arrays, etc.

Also located within telephone 100 is SAS/CAS detector 60 which is coupled to controller 64. Off-hook detector 61 is also coupled to controller 64 for determining whether there are any off-hook extensions. As previously described, off-hook detector 61 may be configured to monitor any wireless links existing between itself 100 and the slave extensions 30, 31, or alternatively, off-hook detector 61 may be configured to monitor line voltage of subscriber line 35. A muting command signal generator/transmitter 62 is also coupled to controller 64 for sending a muting command signal to all off-hook extensions.

Telephone 100 also includes a muting acknowledgement signal receiver 66 for receiving muting acknowledgement signals from all off-hook extensions which have been muted. The receiver 66 is coupled to controller 64. Also coupled to controller 64 is DTMF acknowledgment signal generator/transmitter 69.

Also located within telephone 100 is a muting command signal receiver 72 which is coupled to controller 64 for receiving muting command signals when telephone 100 is operating as a slave extension. Also coupled to controller 64 are a muter 73 and a muting acknowledgement signal generator/transmitter 74. Telephone 100 also includes a speaker 90 and a microphone 91, both of which are coupled to the muter 73.

The present invention provides a system and apparatus with which a telephone line subscriber may receive Type II CID data in a multiple cordless environment. The telephone device, in accordance with a preferred embodiment of the invention, is capable of acting as a master unit and as a slave extension, dependent upon whether the telephone was the first active telephone on the common subscriber line at the time the CO has sent the SAS/CAS signal pair to the common subscriber line.

While a preferred embodiment of the invention has been described and illustrated, it should be apparent that many modifications can be made to the invention without departing from its spirit or scope. For example, while specific circuitry has been depicted as being located within telephone 10, design modifications may be made such that portions of the circuitry are located within a handset of telephone 10 and other portions of the circuitry are located within a base unit of telephone 10. Accordingly, the invention is not limited by the foregoing description or drawings, but is only limited by the scope of the appended claims.

What is claimed as new and desired to be protected by Letters Patent of the United States is:

1. A cordless telephone for processing caller identification (CID) signals, said telephone comprising:
    a base unit;
    a handset, said handset being detachable from said base unit and capable of wirelessly communicating with said base unit;
    a controller located within at least one of said base unit and handset for determining the receipt of caller identification signals; and
    a muting command signal transmitter, said muting command signal transmitter being coupled to said controller, said muting command signal transmitter being capable of transmitting a wireless muting command signal to at least one off-hook extension telephone other than said telephone.

2. The telephone of claim 1, wherein said controller further comprises a processor.

3. The telephone of claim 1 further comprising a muting acknowledgement signal receiver, said muting acknowledgement signal receiver being coupled to said controller, said muting acknowledgement signal receiver being capable of receiving a muting acknowledgement signal from said at least one off-hook extension telephone other than said telephone and also capable of informing said controller of the receipt of said muting acknowledgement signal.

4. The telephone of claim 3 further comprising an off-hook detector, said off-hook detector being coupled to said controller, said off-hook detector being capable of detecting the presence of an off-hook condition at least one extension telephone other than said telephone and informing said controller of said off-hook condition.

5. The telephone of claim 4, wherein said controller is capable of operating said telephone as a master unit when said off-hook detector detects no off-hook condition at said at least one extension telephone other than said telephone.

6. The telephone of claim 4, wherein said controller is capable of operating said telephone as a slave extension when said off-hook detector detects an off-hook condition at said at least one extension telephone other than said telephone.

7. The telephone of claim 3, wherein said muting acknowledgement signal receiver further comprises a RF signal receiver.

8. The telephone of claim 1 further comprising a subscriber alerting signal/customer premise equipment alerting signal (SAS/CAS) signal pair detector coupled to said controller for notifying said controller that a SAS/CAS signal pair has been received.

9. The telephone of claim 8 further comprising a dual tone multi frequency (DTMF) acknowledgement signal transmitter coupled to said controller for transmitting a DTMF acknowledgement signal.

10. The telephone of claim 9 further comprising a muting command signal receiver coupled to said controller for receiving a muting command signal.

11. The telephone of claim 10 further comprising a muter coupled to said controller for muting at least one of a microphone and a speaker of said telephone.

12. The telephone of claim 11 further comprising a muting acknowledgement signal transmitter coupled to said controller for transmitting a muting acknowledgement signal.

13. The telephone of claim 12, wherein said muting acknowledgement signal transmitter is capable of a wireless transmission of said muting acknowledgment signal.

14. The telephone of claim 13, wherein said muting acknowledgement signal transmitter further comprises a RF signal transmitter.

15. The telephone of claim 10, wherein said muting command signal receiver further comprises a RF signal receiver.

16. The telephone of claim 1, wherein said muting command signal transmitter further comprises a RF signal transmitter.

17. A cordless telephone for processing caller identification (CID) signals, said telephone comprising:
 a base unit;
 a handset, said handset being detachable from said base unit and capable of wirelessly communicating with said base unit;
 a controller located within at least one of said base unit and said handset for determining the receipt of caller identification signals;
 a muting command signal transmitter, said muting command signal transmitter being coupled to said controller, said muting command signal transmitter being capable of transmitting a wireless muting command signal to at least one off-hook extension telephone;
 a muting acknowledgement signal receiver coupled to said controller, said muting acknowledgement signal receiver being capable of receiving a muting acknowledgement signal from said at least one off-hook extension telephone and also capable of informing said controller of the receipt of said muting acknowledgement signal;
 a muting command signal receiver coupled to said controller for receiving a muting command signal;
 a muter coupled to said controller for muting at least one of a microphone and a speaker of said telephone;
 a muting acknowledgement signal transmitter controlled by said controller for transmitting a muting acknowledgment signal; and
 an off-hook detector, said off-hook detector being coupled to said controller, said off-hook detector being capable of detecting the presence of an off-hook condition at least one extension telephone and informing said controller of said off-hook condition, and wherein
  said controller is capable of operating said telephone as a master unit when said off-hook detector detects no off-hook condition at said at least one extension telephone other than said telephone, said controller also being capable of operating said telephone as a slave extension when said off-hook detector detects an off-hook condition at said at least one extension telephone other than said telephone.

18. A cordless telephone for processing caller identification (CID) signals, said telephone comprising:
 a base unit;
 a handset, said handset being detachable from said base unit and capable of wirelessly communicating with said base unit;
 a controller located within at least one of said base unit and handset for determining the receipt of caller identification signals;
 a muting command signal transmitter, said muting command signal transmitter being coupled to said controller, said muting command signal transmitter being capable of transmitting a wireless muting command signal to at least one off-hook extension telephone other than said telephone; and
 a muting acknowledgement signal receiver, said muting acknowledgement signal. transmitter being coupled to said controller, said muting acknowledgement signal receiver being capable of receiving a muting acknowledgement signal from said at least one off-hook wireless extension telephone other than said telephone and also capable of informing said controller of the receipt of said muting acknowledgment signal.

19. A cordless telephone for processing caller identification (CID) signals, said telephone comprising:
 a base unit;
 a handset, said handset being detachable from said base unit and capable of wirelessly communicating with said base unit;
 a controller located within at least one of said base unit and handset for determining the receipt of caller identification signals;
 a muting command signal receiver coupled to said controller for receiving a wireless muting command signal from a master telephone unit other than said telephone; and
 a muting acknowledgement signal transmitter coupled to said controller for transmitting a muting acknowledgement signal to said master telephone unit other than said telephone.

20. A system for processing caller identification (CID) signals, the system comprising:
 a plurality of cordless telephones, each being connectable to a telephone line, at least a first one of said cordless telephones being capable of receiving a CID alerting signal from said telephone line,
 said first cordless telephone serving as a master cordless telephone unit, said first cordless telephone, upon detection of said CID alerting signal, being capable of transmitting a muting command signal via a wireless link to one or more of said plurality of cordless telephones, other than said first cordless telephone, which are in an off-hook condition,
 said first cordless telephone also being capable of sending a CID-ready acknowledgement signal to said telephone line.

21. The system as claim 20, wherein a second one of said plurality of cordless telephones is capable of transmitting a muting acknowledgement signal to said first cordless telephone.

22. The system as in claim 21, wherein said second cordless telephone is capable of transmitting said muting acknowledgment signal via a wireless link between said second cordless telephone and said first cordless telephone.

23. The system as in claim 23, wherein said wireless link comprises a RF link.

24. The system as in claim 21, wherein a base unit of said second one of said plurality of cordless telephones is capable of transmitting said muting acknowledgement signal to said first cordless telephone.

25. The system as in claim 24, wherein said base unit of said second one of said plurality of cordless telephones is capable of transmitting said muting acknowledgement signal via a wireless link between said base unit and said first cordless telephone.

26. The system as in claim 25, wherein said wireless link comprises a RF link.

27. The system as in claim 21, wherein a handset of said second one of said plurality of cordless telephones is capable of transmitting said muting acknowledgement signal to said first cordless telephone.

28. The system as in claim 27, wherein said handset of said second one of said plurality of cordless telephones is capable of transmitting said muting acknowledgement signal via a wireless link between said handset and said first cordless telephone.

29. The system as in claim 28, wherein said wireless link comprises a RF link.

30. The system as in claim 20, wherein each of said plurality of cordless telephones is capable of receiving CID data while in an off-hook condition.

31. The system as in claim 20, wherein said CID alerting signal further comprises a signal pair of a subscriber alerting signal (SAS) and a customer premise equipment alerting signal (CAS).

32. The system as in claim 20, wherein said wireless link comprises a RF link.

33. The system as in claim 20, wherein a base unit of said first cordless telephone is capable of transmitting said muting command signal to said one or more of said plurality of cordless telephones in an off-hook condition.

34. The system as in claim 33, wherein said base unit of said first cordless telephone is capable of transmitting said muting command signal via a wireless link between said base unit and said one or more of said plurality of cordless telephones in an off-hook condition.

35. The system as in claim 34, wherein said wireless link comprises a RF link.

36. The system as in claim 20, wherein a handset of said first cordless telephone is capable of transmitting said muting command signal to said one or more of said plurality of cordless telephones in an off-hook condition.

37. The system as in claim 36, wherein said handset of said first cordless telephone is capable of transmitting said muting command signal via a wireless link between said handset and said one or more of said plurality of cordless telephones in an off-hook condition.

38. The system as in claim 20, wherein said CID-ready acknowledgment signal further comprises a dual tone multi frequency (DTMF) signal.

39. The system as in claim 20, wherein said first cordless telephone is capable of sending said CID-ready acknowledgement signal when each of said plurality of cordless telephones which are off-hook have been muted.

40. A method for processing caller identification (CID) signals, the method comprising:
    detecting a CID alerting signal at a first one of a plurality of cordless telephones, said plurality of cordless telephones being connected to a telephone line;
    muting each of said plurality of cordless telephones which is in an off-hook condition;
    receiving at said first cordless telephone signals confirming the muting of said plurality of cordless telephones which are off-hook; and
    sending a CID-ready acknowledgment signal from said first cordless telephone over said telephone line.

41. The method as in claim 40, wherein said act of sending further comprises sending said CID-ready acknowledgement signal upon receipt of a confirmation signal from each off-hook cordless telephone.

42. The method as in claim 40, wherein said act of sending further comprises sending said CID-ready acknowledgement signal upon receipt of said CID alerting signal.

43. The method as in claim 40 further comprising:
    sending a muting confirmation signal from a second cordless telephone which is off-hook; and
    receiving said muting confirmation signal at said first cordless telephone.

44. The method as in claim 40, wherein said act of detecting a CID alerting signal further comprises detecting a signal pair of a subscriber alerting signal (SAS) and a customer premise equipment alerting signal (CAS).

45. The method as in claim 40, wherein said act of detecting said CID alerting signal at a first cordless telephone further comprises detecting said CID alerting signal at a base unit of said first cordless telephone.

46. The method as in claim 40 further comprising detecting said CID alerting signal at a second one of said plurality of cordless telephones.

47. The method as in claim 46 further comprising detecting said CID alerting signal at a base unit of said second cordless telephone.

48. The method as in claim 40, wherein said act of muting further comprises sending a muting command signal to each of said plurality of cordless telephones in an off-hook condition.

49. The method as in claim 48 wherein said act of sending a muting command further comprises sending said muting command signal via a wireless link between said first cordless telephone and each of said plurality of cordless telephones in an off-hook condition.

50. The method as in claim 49, wherein said wireless link comprises a RF link.

51. The method as in claim 48, wherein said act of sending a muting command signal further comprises sending said muting command signal from a base unit of said first telephone to each of said plurality of cordless telephones in an off-hook hook condition.

52. The method as in claim 51, wherein said act of sending a muting command signal further comprises sending said muting command signal via a wireless link between said base unit of said first telephone and each of said plurality of cordless telephones in an off-hook condition.

53. The method as in claim 52, wherein said wireless link comprises a RF link.

54. The method as in claim 48, wherein said act of sending a muting command signal further comprises sending said muting command signal from a handset of said first telephone to each of said plurality of cordless telephones in an off-hook condition.

55. The method as in claim 54, wherein said act of sending a muting command signal further comprises sending said muting command signal via a wireless link between said handset of said first telephone and each of said plurality of cordless telephones in an off-hook condition.

56. The method in claim 55, wherein said wireless link comprises a RF link.

57. The method as in claim 40, wherein said act of sending a CID-ready acknowledgement signal further comprises sending a dual tone multi frequency (DTMF) signal from said first cordless telephone over said telephone line.

58. The method as in claim 40, wherein said act of receiving further comprises receiving said signals confirming the muting of said plurality of cordless telephones which are off-hook at a base unit of said first cordless telephone.

59. The method as in claim 58, wherein said act of receiving said signals confirming the muting of said plurality of cordless telephones further comprises receiving said signals via a wireless link between said base unit of said first cordless telephone and each of said plurality of cordless telephones which are off-hook.

60. The method as in claim 59, wherein said wireless link comprises a RF link.

61. The method as in claim 40, wherein said act of receiving further comprises receiving said signals confirming the muting of said plurality of cordless telephones which are off-hook at a handset of said first cordless telephone.

62. The method as in claim 61, wherein said act of receiving said signals confirming the muting of said plurality of cordless telephones further comprises receiving said signals via a wireless link between said handset of said first cordless telephone and said plurality of cordless telephones which are off-hook.

63. The method as in claim 62, wherein said wireless link comprises a RF link.

64. The method as in claim 40 further comprising:

designating a first one of said plurality of cordless telephones as a master telephone; and designating each one of a remainder of said plurality of cordless telephones, other than said first cordless telephone, as a slave extension.

65. The method as in claim 64, wherein said act of designating a first one further comprises designating a first one of said plurality of cordless telephones that goes off-hook as a master telephone unit.

66. The method as in claim 64, wherein said act of designating each one of a remainder further comprises designating each one of said plurality of cordless telephones, other than a first one of said plurality of cordless telephones that goes off-hook, as a slave extension.

* * * * *